United States Patent [19]

Ashinuma

[11] Patent Number: 4,667,246
[45] Date of Patent: May 19, 1987

[54] IMAGE PROCESSING SYSTEM

[75] Inventor: Takaaki Ashinuma, Yokohama, Japan

[73] Assignee: Canon Kabushiki Kaisha, Tokyo, Japan

[21] Appl. No.: 724,548

[22] Filed: Apr. 18, 1985

[30] Foreign Application Priority Data

Apr. 25, 1984 [JP] Japan ................................ 59-81697

[51] Int. Cl.⁴ ............................................... H04N 1/04
[52] U.S. Cl. ..................................... 358/264; 358/267
[58] Field of Search ............... 358/264, 286, 293, 294, 358/256, 267

[56] References Cited

U.S. PATENT DOCUMENTS 4,346,410 8/1982 Maeno ............................. 358/264 X

FOREIGN PATENT DOCUMENTS 3014409 10/1980 Fed. Rep. of Germany ...... 358/286
0006568 1/1981 Japan ................................. 358/264
0104564 6/1983 Japan ................................. 358/264
0133079 8/1983 Japan ................................. 358/264

Primary Examiner—Michael A. Masinick
Attorney, Agent, or Firm—Fitzparick, Cella, Harper & Scinto

[57] ABSTRACT

An image processing system for recording or reproducing image information includes: a reader for photo-electrically reading image information from a photo disc; a movable storage medium such as a photo sensitive drum in which image information has been stored; a recorder such as a printer for recording on a recording medium the image information read out from the reader; and a signal transmitter such as a line buffer memory for transmitting the image information read out by the reader to the recorder in response to a synchronization signal from the recorder, in which this synchronization signal and a synchronization signal of the reader are formed on the basis of the same internal reference clock of the recorder. With this system, the successive image information can be stably and certainly recorded or reproduced on a nearly real-time basis without using a page memory.

17 Claims, 5 Drawing Figures

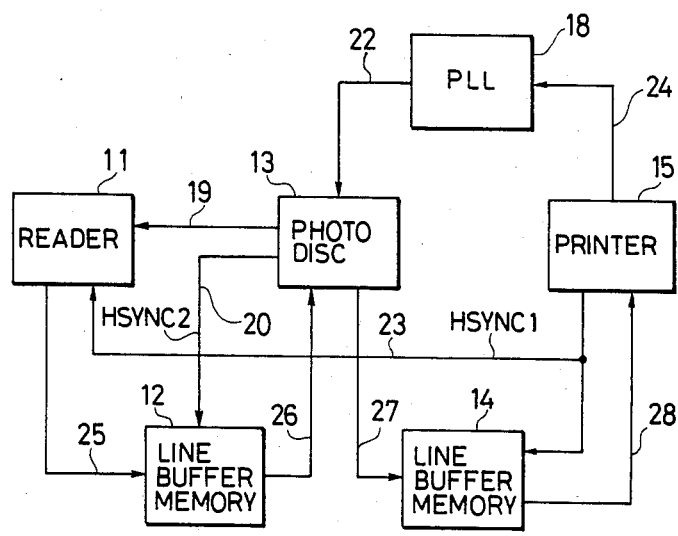
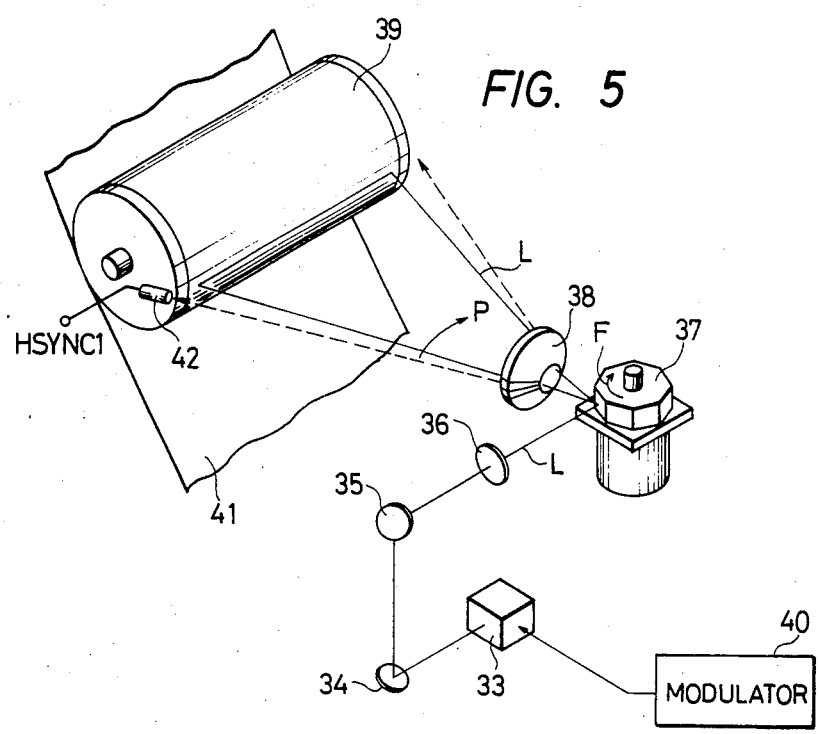

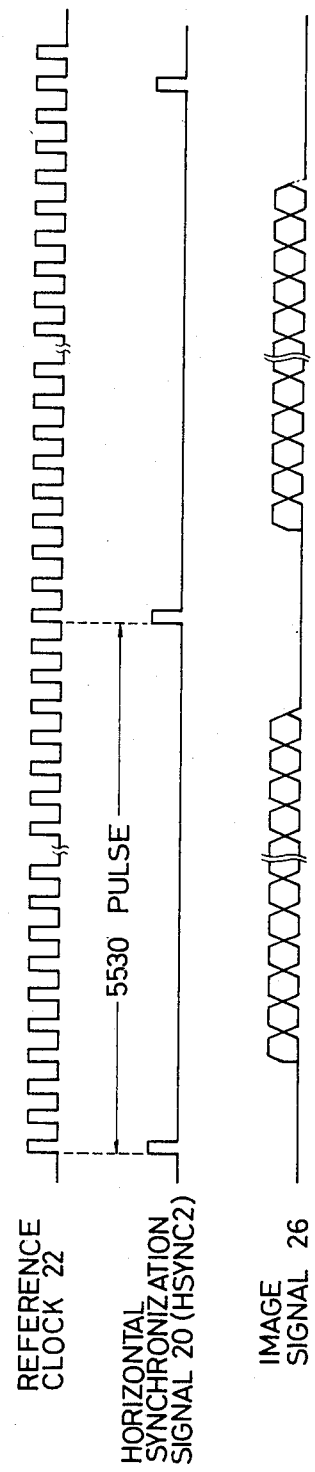

IMAGE PROCESSING SYSTEM

BACKGROUND OF THE INVENTION

1. Field of the Invention

The present invention relates to an image processing system for recording or reproducing image information.

2. Description of the Prior Art

Conventionally, such a kind of image processing system has been constituted as shown in FIG. 1. Practically speaking, in a conventional system shown in FIG. 1 reference numeral 1 denotes an image information input apparatus for inputting image information, i.e., what is called a reader; 2 is a line buffer memory for storing the image information inputted from the reader 1 for tens of horizontal synchronization periods, namely, for tens of lines; 3 is an optical recording/reproducing apparatus such as a photo disc or the like for optically recording or reproducing the image information; 4 is a line buffer memory similar to the memory 2; and 5 is an image information output apparatus for visually outputting the image information by printing it, i.e., a printer.

The conventional system shown in FIG. 1 operates at the timing as the overall system using a horizontal synchronization signal HSYNC from the printer 5 as a reference signal. However, each unit of the line buffer memories 2 and 4, photo disc 3 and printer 5 operates on the basis of a reference clock of the individual system for every unit. The frequencies or phases of the reference clocks of the respective units do not always completely coincide with one another. In addition, the horizontal sync signal HSYNC from the printer 5 is formed in association with the rotation of a mechanical rotating mechanism, e.g., polygon scanner in the printer 5, so that there is the drawback of a slight time-dependent fluctuation, i.e., what is called a "jitter".

Generally, when image information is recorded on a recording medium, the signal to be recorded has to be successive in the case of continuously recording, instead of a sector method of recording. However, as mentioned above, if each unit operates in response to the clock of the individual systems and also jitter is included in the horizontal sync signal HSYNC which is used as a reference signal for the overall operation timing, the image starting positions of respective lines do not coinide, so that discontinuity occurs in the recording images in the boundary portion of the respective lines. Further, in the case where the readout of the image information from the line buffer memory 2 is controlled on the basis of the reference clock for driving the photo disc 3 in order to avoid the occurrence of such discontinuity, a deviation of the horizontal synchronization will have occurred little by little in the recording images for every page due to the frequency deviation between the reference clock for driving of the printer 5 and the reference clock for driving of the photo disc 3.

To prevent such a deviation in the images, as shown in FIG. 2, it is necessary to use page buffer memories 6 and 7, each having a large capacity in place of the line buffer memories 2 and 4, and to control the readout to the print-out of the image information on a page unit basis. Therefore, there is a drawback such that a complicated and expensive memory device has to be used.

SUMMARY OF THE INVENTION

It is an object of the present invention to eliminate the foregoing drawbacks.

It is another object of the invention to improve an image processing system.

Still another object of the invention is to provide an image processing system which can stably print on a real-time basis the image information reproduced from movable storage means.

Still another object of the invention is to provide an image processing system which stably stores on a real-time basis the image information read out from reading means into storage means.

Still another object of the invention is to provide an image processing system which can stably and certainly record or reproduce successive image information without using an expensive and complicated page memory of a large capacity and which can perform the signal processing steps from the inputting of the image information to the recording thereof on substantially a real-time basis.

Other objects and features of the present invention will become apparent from the following detailed description with reference to the accompanying drawings.

BRIEF DESCRIPTION OF THE DRAWINGS

FIG. 3 is a block diagram showing an example of an arrangement of an image processing system of the present invention;

FIG. 4 is a time chart for a reference clock, a horizontal sync signal and an image signal; and FIG. 5 is a perspective view of a printer.

DETAILED DESCRIPTION OF THE PREFERRED EMBODIMENT

Figure 1:
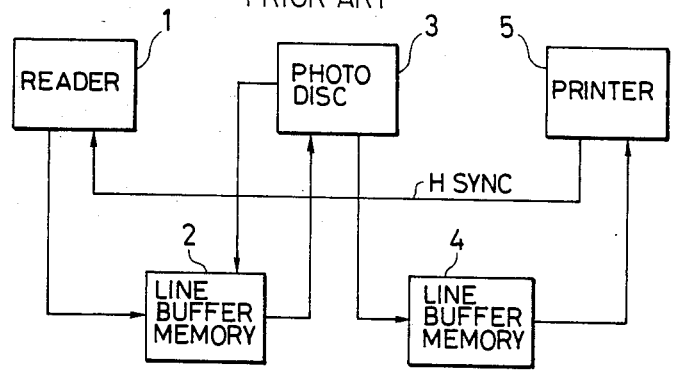
FIG. 1 is a block diagram showing an example of an arrangement of a conventional image processing system.
Figure 2:
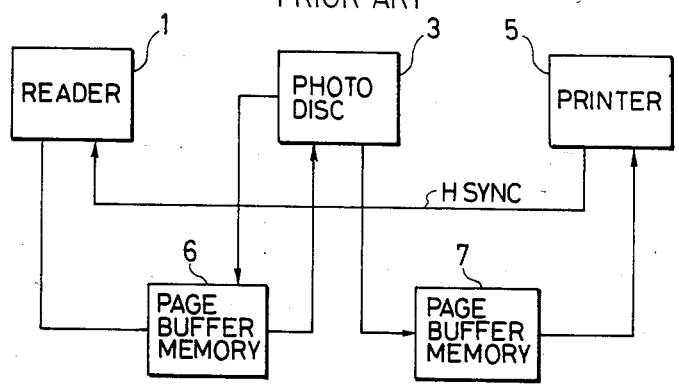
FIG. 2 is a block diagram showing an example of another arrangement of the same.

One embodiment of the present invention will now be described in detail hereinbelow with reference to the drawings.

FIG. 3 shows an example of a schematic arrangement of an image processing system to which the present invention can be applied. In the arrangement shown in the diagram, a reference numeral 11 denotes an input apparatus of image information, such as a reader, for reading out image information and inputting it; 12 is a line buffer memory for storing the image information supplied from the reader 11 for tens of horizontal synchronization periods, i.e., for tens of lines; 13, an optical recording/reproducing apparatus such as photo disc or the like for recording or reproducing the image information read out from the line buffer memory 12 (hereinafter, this apparatus is referred to as a photo disc apparatus); 14, a line buffer memory similar to the memory 12 for temporarily storing the image information reproduced from the photo disc apparatus 13; and 15, an image information output apparatus for printing and outputting the image information read out from the line buffer memory 14, i.e., what is called a printer (a laser beam printer or the like is used). A numeral 18 indicates a phase locked loop (PLL) circuit which generates a clock signal synchronized with a driving reference clock for the printer 15 and supplies it to the photo disc apparatus 13.

The system of the invention, constituted as shown FIG. 3, operates in a manner as described hereinbelow.

The PLL circuit 18 for generating a reference clock for recording or reproduction of the photo disc apparatus 13 receives, as a reference signal, a signal 24 of the frequency which is obtained by dividing by 32 a reference clock to drive a scanner motor (not shown) for scanning a laser beam of the printer 15. The PLL circuit 18 multiplies the frequency of the signal 24 by 64 and then divides by ½ its oscillation output and generates the output thus derived as a reference clock 22 for recording or reproduction of the photo disc apparatus 13.

In the photo disc apparatus 13, the reference clock 22 is divided by 5530 to produce a horizontal synchronization signal 20 (HSYNC$_2$) for recording. FIG. 4 shows the relations among these horizontal sync signal 20, reference clock 22 and image signal 26. On the other hand, a horizontal synchronization signal 23 (HSYNC$_1$) is transmitted from the printer 15 synchronously with the operation of the scanner in the printer 15, so that the signal 23 has a certain degree of jitter. However, it commonly uses the reference clock signal 24 together with the foregoing horizontal sync signal 20 for recording or reproduction; therefore, their frequencies are the same without causing a frequency deviation.

· Upon starting of the recording operation of the image information, a data request signal 19 for requesting the transmission of the image information is first sent from the photo disc apparatus 13 to the reader 11. Image information 25 read out by the reader 11 is sequentially stored on a line-by-line basis in the line buffer memory 12 in response to the horizontal sync signal 23 from the printer 15 and of the internal reference clock of the reader 11. After completion of storage of the image information, as much as a few lines into the line buffer memory 12, this image information is sequentially read out from the memory 12 synchronously with the horizontal sync signal 20 in response to a line buffer memory read out clock using the horizontal sync signal 20 from the photo disc apparatus 13 and the reference clock 22 for recording as a reference signal.

An image information signal 26 which was read out from the line buffer memory 12 and supplied to the photo disc apparatus 13 is MFM modulated by a modulator (not shown) synchronously with the reference clock 22. In addition to this, the horizontal sync signal 20 is synthesized with the MFM modulated image signal in compliance with a prefixed rule and is recorded on the disc on the basis of this synthesized signal.

As described above, by eliminating the synchronization deviation of the reference clocks for the reader 11 and photo disc apparatus 13, the image information can be accurately recorded on the disc on substantially a real-time basis.

Upon reproduction of the image, the image information read out from the disc is MFM demodulated by a demodulator (not shown) and the horizontal sync signal 20 synthesized in the MFM signal is detected and this is used as the horizontal sync signal for reproduction. Similarly, the reference clock 22 extracted from the MFM signal is used as the reference clock for reproduction. Image information 27 is sequentially stored into the line buffer memory 14 in response to the horizontal sync signal for reproduction and reference clock for reproduction. After completion of storage of the image information signal, as much as a few lines into the line buffer memory 14 in this way and similar to the case of the recording, this image information is sequentially read out synchronously with the horizontal sync signal 23 from the printer 15 in response to the internal reference clock from the printer 15 and is supplied to the printer 15 and is printed.

As described above, by synchronizing the reference clock of the photo disc apparatus 13 with the reference clock of the printer 15, the image information read out from the disc can be accurately printed on substantially a real-time basis.

FIG. 5 is a perspective view of the printer 15. A modulator 40 controls a laser oscillator 33 in response to an image signal 28 outputted from the line buffer 14, thereby allowing a laser beam L to be modulated. The modulated laser beam L is radiated onto a polygon scanner 37 through mirrors 34 and 35 and a lens 36. The polygon scanner 37 is rotating at a consant angular velocity, so that the laser beam L reflected by the polygon scanner 37 scans on a photo sensitive drum 39 through an FΘ lens 38. When a beam detector 42 arranged on the outside of the drum 39 detects the laser beam L, the horizontal sync signal 23 (HSYNC$_1$) is outputted.

In the foregoing embodiment of the invention, the reference clock 22 for recording or reproduction is formed using the PLL circuit 18 from the clock which is derived by dividing by 32 the reference clock generated due to the scanning operation in the printer 15. However, in the case where the reference clock of the printer 15 has the frequency which is integer times larger than the reference clock frequency needed for recording or reproduction, the PLL circuit 18 can be omitted.

The present invention is not limited to the foregoing embodiments, but many modifications and variations are possible within the spirit and scope of the appended claims of the invention.

What is claimed is:

1. An image processing system comprising:
a movable storage medium in which image information is stored;
reproducing means for reproducing image information stored in said storage medium in response to a synchronization signal;
recording means for recording on a recording member the image information reproduced by said reproducing means; and
signal transmitting means for transmitting the image information reproduced by said reproducing means to said recording means in response to a synchronization signal from said recording means,
wherein the synchronization signal of said recording means and the synchronization signal of said reproducing means are formed on the basis of the same clock.

2. An image processing system according to claim 1, wherein said signal transmitting means is a line memory.

3. An image processing system according to claim 2, wherein said line memory stores image signals of a plurality of lines.

4. An image processing system according to claim 3, wherein the readout from said line memory is controlled by a horizontal synchronization signal from said recording means.

5. An image processing system according to claim 2, wherein the readout from said line memory is controlled by a horizontal synchronization signal from said recording means.

6. An image processing system according to claim 1, wherein said clock is an internal reference clock of said recording means.

7. An image processing system according to claim 1, wherein said reproducing means sends image information to said signal transmitting means in response to said synchronization signal of said reproducing means.

8. An image processing system according to claim 1, wherein said reproducing means reproduces image information in synchronization with a clock signal formed on the basis of said clock.

9. An image processing system comprising:
means for generating image information;
storage means for storing the image information generated by said generating means;
signal transmitting means for transmitting the image signal from said generating means to said storage means in response to a synchronization signal; and
means for processing image information output from at least one of said storage means and said generating means in response to a synchronization signal,
wherein said synchronization signal of said signal transmitting means is formed on the basis of said synchronization signal of said image processing means.

10. An image processing system according to claim 9, wherein said image processing means has means for printing an output of said storage means.

11. An image processing system according to claim 9, wherein said generating means includes means for photo-electrically reading an original image and outputting an image signal thereof.

12. An image processing system comprising:
means for generating image information;
storage means for storing the image information generated by said generating means in response to a reference clock;
signal transmitting means for transmitting the image signal from said generating means to said storage means in response to a synchronization signal; and
means for processng image information from at least one of said generating means and said storage means,
wherein said synchronization signal is formed on the basis of said reference clock and said reference clock is formed on the basis of operations of said image processing means.

13. An image processing system according to claim 12, wherein said synchronization signal is derived by dividing said reference clock.

14. An image processing system according to claim 12, wherein said generating means includes means for photo-electrically reading an original image and outputting an image signal thereof.

15. An image processing system comprising:
a plurality of image processing means which sequentially process an image signal and each of which has a reference clock for driving;
means for allowing the reference clocks of said plurality of image processing means to be synchronized; and
means for forming a synchronization signal for processing said image signal on the basis of one of the reference clocks from a specified one of said plurality of image processing means.

16. An image processing system according to claim 15, wherein said plurality of image processing means are image information reading means, recording/reproducing means, output means for making image information visible, and the like.

17. An image processing system according to claim 16, wherein said specified one image processing means includes said output means.

* * * * *

UNITED STATES PATENT AND TRADEMARK OFFICE
CERTIFICATE OF CORRECTION

PATENT NO. : 4,667,246

DATED : May 19, 1987

INVENTOR(S) : TAKAAKI ASHINUMA

It is certified that error appears in the above-identified patent and that said Letters Patent is hereby corrected as shown below:

AT [57] ABSTRACT:

Line 2, delete ":" (semicolon).
    Line 4, "photo sensitive" should read
        --photosensitive--.

COLUMN 1

Lines 49-50, "coi-/nide" should read --coincide--.

COLUMN 4

Line 18, "photo sensitive" should read
        --photosensitive--.

COLUMN 6

Line 4, "processng" should read --processing--.

Signed and Sealed this

Fifteenth Day of September, 1987

Attest:

DONALD J. QUIGG

*Attesting Officer*      *Commissioner of Patents and Trademarks*